(12) United States Patent
Hung et al.

(10) Patent No.: US 8,432,671 B2
(45) Date of Patent: Apr. 30, 2013

(54) EXTERNAL EXTENSION FOR HOLDING A PORTABLE COMPUTER AND COMPUTER SYSTEM THEREWITH

(75) Inventors: Ming-Hua Hung, New Taipei (TW); Wen-Chin Wu, New Taipei (TW); Chang-Chih Han, New Taipei (TW); Pei-Chen Chin, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 209 days.

(21) Appl. No.: 13/165,798

(22) Filed: Jun. 22, 2011

(65) Prior Publication Data

US 2011/0317354 A1 Dec. 29, 2011

(30) Foreign Application Priority Data

Jun. 24, 2010 (TW) .............................. 99211998 U (51) Int. Cl.
*G06F 1/16* (2006.01)

(52) U.S. Cl.
USPC ....... 361/679.02; 700/796; 600/476; 345/522

(58) Field of Classification Search .................. 700/231, 700/97; 600/347, 345, 341, 365, 309, 476, 600/547; 361/679.37, 679.31, 679.46, 679.09, 361/679.55, 679.34, 679.33, 679.6, 679.01, 361/679.27, 679.28, 679.58, 679.12, 679.13, 361/679.35, 679.41, 679.4, 679.53, 697, 361/760, 796; 455/575.1, 575.3, 556.1, 557; 345/158, 173, 168, 163, 156, 166, 157, 161, 345/522, 184; 713/310, 153, 168, 182, 2; 165/80.3, 122

See application file for complete search history.

(56) References Cited

U.S. PATENT DOCUMENTS

| | | | | |
|---|---|---|---|---|
| 5,694,293 | A * | 12/1997 | Seto et al. ................ | 361/679.26 |
| 7,136,282 | B1 * | 11/2006 | Rebeske .................. | 361/679.55 |
| 2004/0114315 | A1 * | 6/2004 | Anlauff ........................ | 361/681 |
| 2006/0268499 | A1 * | 11/2006 | Chan et al. .................... | 361/683 |
| 2009/0052125 | A1 * | 2/2009 | Hirao ....................... | 361/679.55 |

* cited by examiner

*Primary Examiner* — Hung Duong
(74) *Attorney, Agent, or Firm* — Winston Hsu; Scott Margo (57) ABSTRACT

An external extension for holding a portable computer includes a base, a keyboard module disposed on a first area of the base, a pin set disposed on a third area of the base and electrically connected to the keyboard module, and a protecting cover disposed on the first area in a pivotable manner and adjacent to a second area of the base. The protecting cover covers the keyboard module when the protecting cover pivots relative to the base at a first position. The protecting cover is for holding the portable computer when the protecting cover pivots relative to the base at a second position and a side of the protecting cover contacts against a lateral side of the second area, so that a visual angle can be formed between the portable computer and the keyboard module.

20 Claims, 7 Drawing Sheets

EXTERNAL EXTENSION FOR HOLDING A PORTABLE COMPUTER AND COMPUTER SYSTEM THEREWITH

BACKGROUND OF THE INVENTION

1. Field of the Invention

The present invention relates to an external extension and a computer system, and more particularly, to an external extension for holding a portable computer and a computer system therewith.

2. Description of the Prior Art

A conventional tablet computer utilizes a touch panel to input control signals. For operational convenience of the touch panel, an external keyboard is applied to be an alternative selection. The conventional external keyboard includes a base, a keyboard structure, and a supporting mechanism disposed on the base for supporting the keyboard structure. The conventional external keyboard disclosed in T.W. patent No. 545858 and 1295705 utilize the supporting mechanism capable of pivoting relative to the base for holding the tablet computer. However, operation of the conventional external keyboard for holding the tablet computer is complex and can not hold the tablet computer stably. Further, the conventional external keyboard does not include a protecting mechanism for protecting the keyboard structure, so that buttons of the external keyboard might be damaged by dust and mist easily. Thus, design of an external keyboard with preferred holding stability and operational convenience is an important issue in the computer industry.

SUMMARY OF THE INVENTION

The present invention provides an external extension for holding a portable computer and a computer system therewith for solving above drawbacks.

According to the claimed invention, an external extension for holding a portable computer includes a base. The base includes a first area, a second area, and a third area. The external extension further includes a keyboard module disposed on the first area of the base, a pin set disposed on the third area of the base and electrically connected to the keyboard module for connecting to the portable computer so as to transmit a signal generated by the keyboard module to the portable computer, and a protecting cover disposed on the first area of the base in a pivotable manner and adjacent to the second area. The protecting cover covers the keyboard module when the protecting cover pivots relative to the base at a first position, and the protecting cover is for holding the portable computer when the protecting cover pivots relative to the base at a second position and a side of the protecting cover contacts against a lateral side of the second area, so that a visual angle is formed between the portable computer and the keyboard module.

According to the claimed invention, the third area is disposed between the first are and the second area, and the third area is a sunken structure for placing the portable computer.

According to the claimed invention, an arc structure is formed on a lateral side of the protecting cover, and a curvature of the arc structure is substantially equal to a curvature of a casing of the portable computer.

According to the claimed invention, the visual angle is substantially 105 degrees.

According to the claimed invention, the external extension further includes a speaker module disposed on the second area of the base and electrically connected to the pin set.

According to the claimed invention, the external extension further includes a holding component, an end of the holding component being disposed on the second area of the base in a pivotable manner, at least one fixing portion being formed on the protecting cover for fixing the other end of the holding component so as to constrain rotational movement of the protecting cover relative to the base when the protecting cove pivots relative to the base to the visual angle.

According to the claimed invention, the fixing portion is a slot.

According to the claimed invention, the external extension further includes a supporting component, an end of the supporting component being disposed on the protecting cover in a pivotable manner, a sliding slot being formed on the second area of the base, at least one contacting portion being disposed inside the sliding slot, and the other end of the supporting component being disposed inside the sliding slot of the second area in a slidable manner for contacting against the contacting portion of the sliding slot so as to constrain rotational movement of the protecting cover relative to the base when the protecting cover pivots relative to the base.

According to the claimed invention, the external extension further includes a magnetic component disposed on the base for attracting the portable computer so as to combine the external extension with the portable computer.

According to the claimed invention, a computer system includes a portable computer, and an external extension for holding the portable computer. The external extension includes a base. The base includes a first area, a second area, and a third area. The external extension further includes a keyboard module disposed on the first area of the base, a pin set disposed on the third area of the base and electrically connected to the keyboard module for connecting to the portable computer so as to transmit a signal generated by the keyboard module to the portable computer, and a protecting cover disposed on the first area of the base in a pivotable manner and adjacent to the second area. The protecting cover covers the keyboard module when the protecting cover pivots relative to the base at a first position, and the protecting cover is for holding the portable computer when the protecting cover pivots relative to the base at a second position and a side of the protecting cover contacts against a lateral side of the second area, so that a visual angle is formed between the portable computer and the keyboard module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
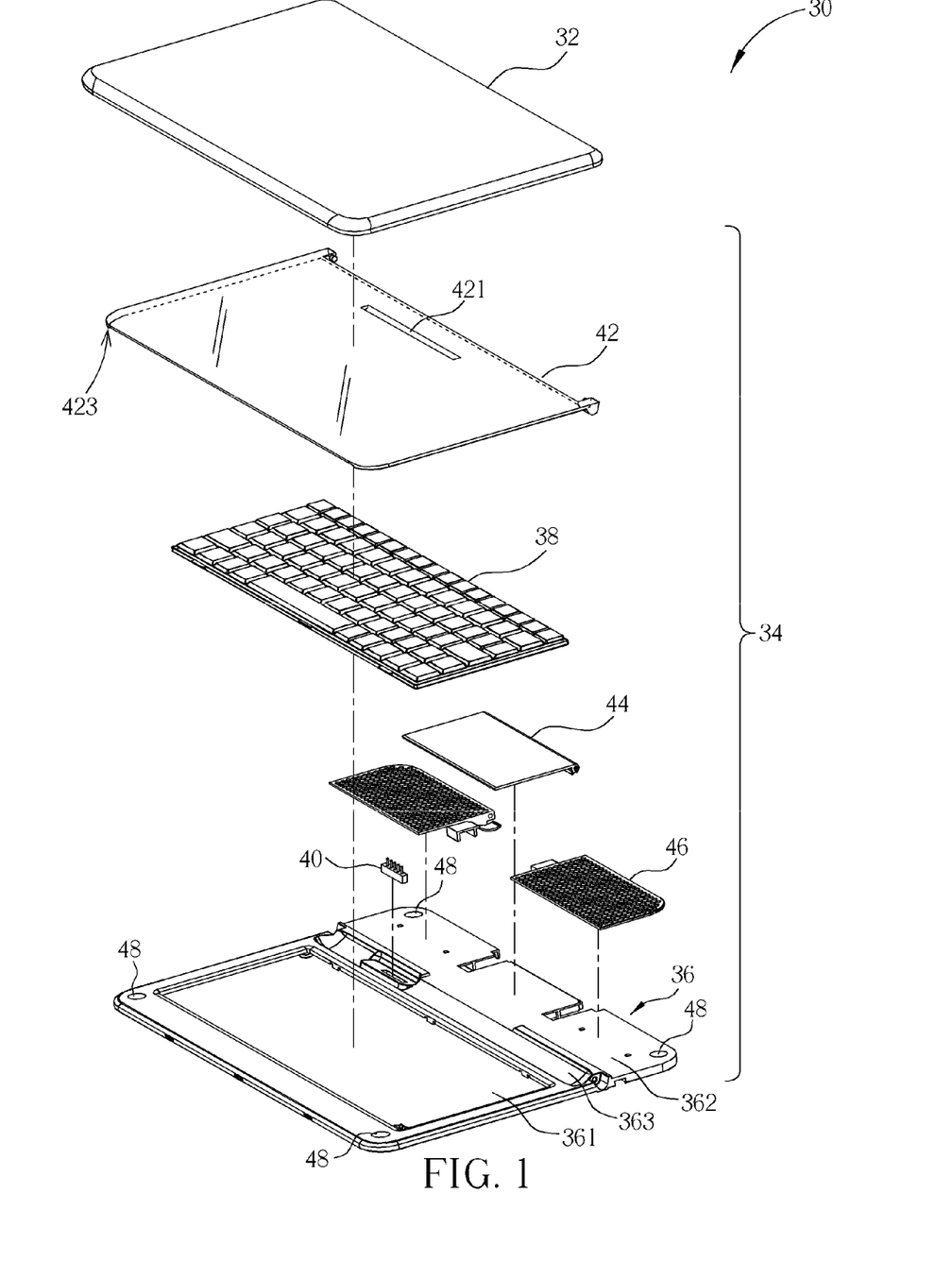
FIG. 1 is an exploded diagram of a computer system according to a first embodiment of the present invention.
Figure 2:
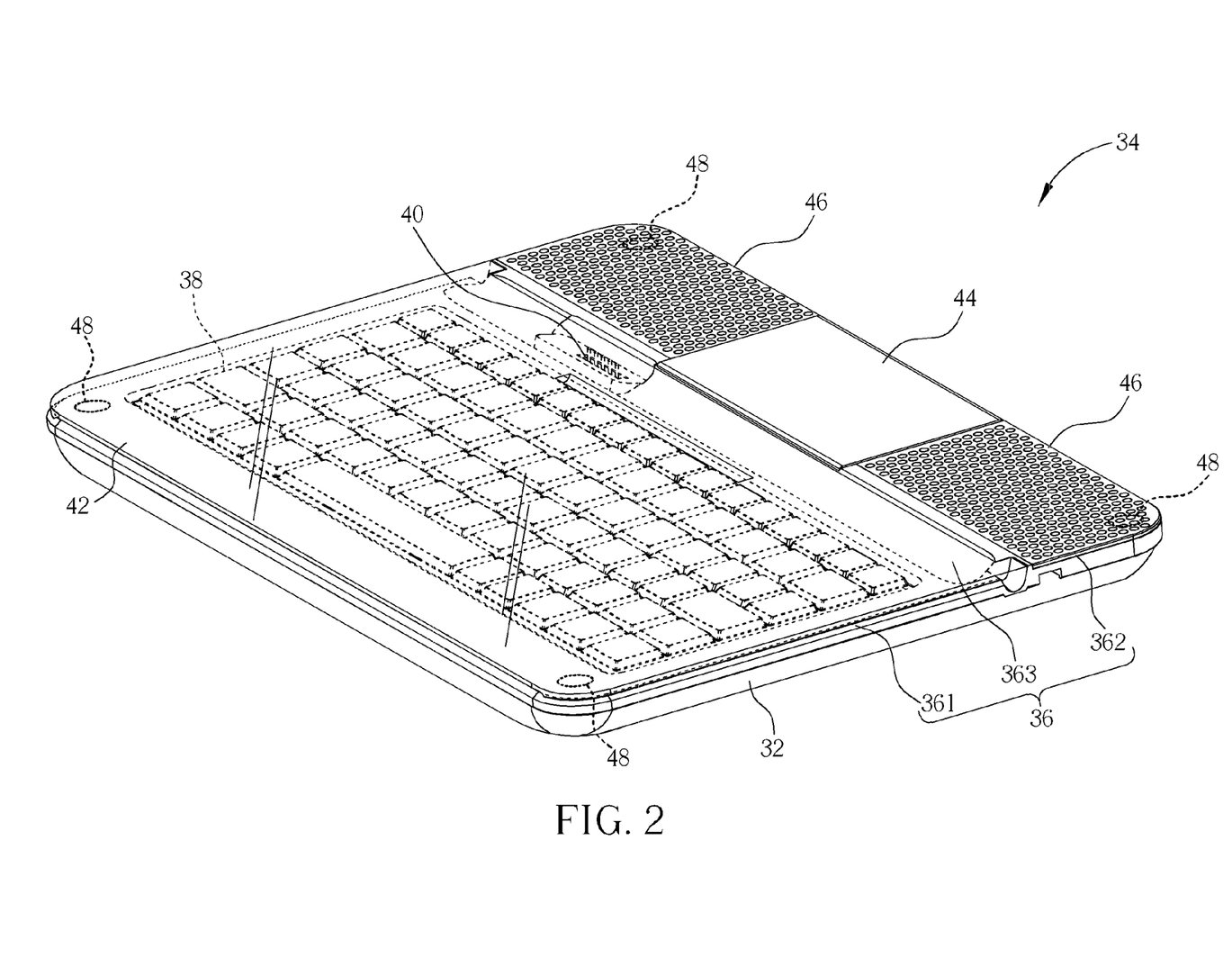
FIG. 2 and FIG. 3 are diagrams of the computer system in different operating modes according to the first embodiment of the present invention.
Figure 3:
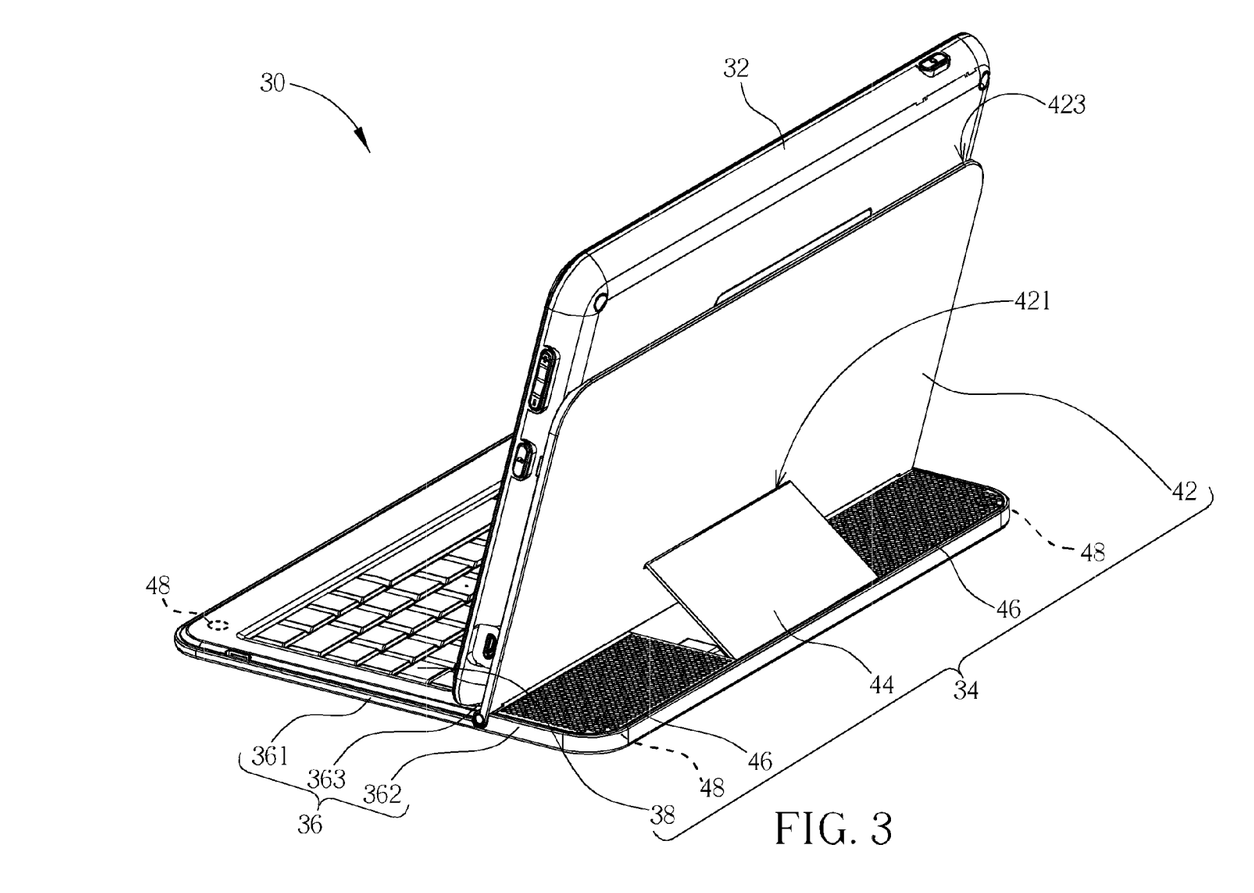

Please refer to FIG. 1 to FIG. 3. FIG. 1 is an exploded diagram of a computer system 30 according to a first embodiment of the present invention. FIG. 2 and FIG. 3 are diagrams of the computer system 30 in different operating modes according to the first embodiment of the present invention. The computer system 30 includes a portable computer 32, and an external extension 34 for holding the portable computer 32. The portable computer 32 can be a tablet computer, which includes a touch panel for inputting a control signal. In addition, a user can utilize the external extension 34 to be an inputting interface of the tablet computer alternately, so as to operate the tablet computer comfortably. The external extension 34 includes a base 36, and the base 36 includes a first area 361, a second area 362, and a third area 363. The external extension 34 further includes a keyboard module 38 disposed on the first area 361 of the base 36, and a pin set 40 disposed on the third area 363 of the base 36 and electrically connected to the keyboard module 38. The third area 363 can be a sunken structure, which is located between the first area 361 and the second area 362 for placing the portable computer 32. The pin set 40 is for connecting to the portable computer 32, so as to transmit signals generated by the keyboard module 38 to the portable computer 32. For example, the pin set 40 can be a pogo pin set, and a conductive clip of the portable computer 32 can be electrically connected to the pogo pin set by easy touch. Therefore, contacting range between the portable computer 32 and the pin set 40 is increased, and assembly convenience of the computer system 30 is improved. In addition, amounts of the pins of the pin set 40 can be adjusted according to actual demand. The external extension 34 further includes a protecting cover 42 disposed on the first area 361 of the base 36 in a pivotable manner and adjacent to the second area 362. The protecting cover 42 can be made of transparent material or opaque material. A pivotal axle between the protecting cover 42 and the base 36 can be made of metal material for holding the portable computer 32 stably. As shown in FIG. 2, when the portable computer 32 is not placed on the external extension 34 and the protecting cover 42 pivots relative to the base 36 at a first position, the protecting cover 42 covers the keyboard module 38, so as to prevent the keyboard module 38 from being destroyed by dust and mist. On the other hand, as shown in FIG. 3, when the protecting cover 42 pivots relative to the base 36 at a second position and a side of the protecting cover 42 contacts against a lateral side of the second area 362, the protecting cover 42 can hold the portable computer 32, so as to form a visual angle between the portable computer 32 and the keyboard module 38. The visual angle can be adjusted according to the user's demand, and is substantially 105 degrees preferably.

Besides, the external extension 34 can further include a holding component 44. An end of the holding component 44 is disposed on the second area 362 of the base 36 in a pivotable manner. At least one fixing portion 421 can be formed on the protecting cover 42 for fixing the other end of the holding component 44 when the protecting cover 42 pivots relative to the base 36 at the predetermined visual angle, so as to constrain rotational movement of the protecting cover 42 relative to the base 36. For example, the fixing portion 421 can be a slot, and the other end of the holding component 44 is wedged inside the slot for constraining the rotational movement of the protecting cover 42 relative to the base 36. In the embodiment, the amount of the fixing portion 421 is not limited. For example, a plurality of fixing potions 421 can be formed on the protecting cover 42. The user can adjust the visual angle between the portable computer 32 and the keyboard module 38 by wedging the other end of the holding component 44 into different fixing portions 421 selectively. An arc structure 423 can be formed on a lateral side of the protecting cover 42, and curvature of the arc structure 423 can match curvature of a casing of the portable computer 32 preferably. As the curvature of the arc structure 423 matches the curvature of the casing of the portable computer 32, the arc structure 423 can be for guiding the portable computer 32 to tightly contact on the protecting cover 42 when the portable computer 32 is placed against the protecting cover 42, so as to increase stability of the portable computer 32. Furthermore, the external extension 34 can further include at least one speaker module 46 disposed on the second area 362 of the base 36 and electrically connected to the pin set 40, and at least one magnetic component 48 disposed on the base 36, such as disposing on two sides of the base 36. The speaker module 46 can be an external speaker of the portable computer 32, and audio signals can be transmitted from the portable computer 32 to the speaker module 46 via the pin set 40 for preferred acoustic quality. A metal component with magnetic attraction can be disposed on the casing of the portable computer 32, so that the external extension 34 can utilize the magnetic component 48 to attract the portable computer 32, so as to combine the external extension 34 with the portable computer 32 for convenience.

Operating method of the computer system 30 is described as follows. When the computer system 30 is not in use, the user can rotate the holding component 44 relative to the base 36 to place on the second area 362 of the base 36, and rotate the protecting cover 42 relative to the base 36 at the first position to place on the keyboard module 38. And then the user can utilize the magnetic component 48 to combine the external extension 34 with the portable computer 32, so as to minimize volume of the external extension 34 and the computer system 30 for convenient carriage as shown in FIG. 2. On the other hand, the user separates the external extension 34 from the portable computer 32 as the computer system 30 begins in use. The holding component 44 is unfolded, and the protecting cover 42 pivots relative to the base 36 at the second position, as shown in FIG. 3. Meanwhile, the side of the protecting cover 42 contacts against the lateral side of the second area 362, and the other end of the holding component 44 can be wedged inside the fixing portion 421 of the protecting cover 42, so as to constrain the rotational movement of the protecting cover 42. Finally, the portable computer 32 is placed on the third area 363, a side of the portable computer 32 contacts against the protecting cover 42, and the other side of the portable computer 32 is electrically connected to the pin set 40, so that the signal generated by the external extension 34 can be transmitted to the portable computer 32, and assembly of the external extension 34 and the portable computer 32 is finished.

Figure 4:
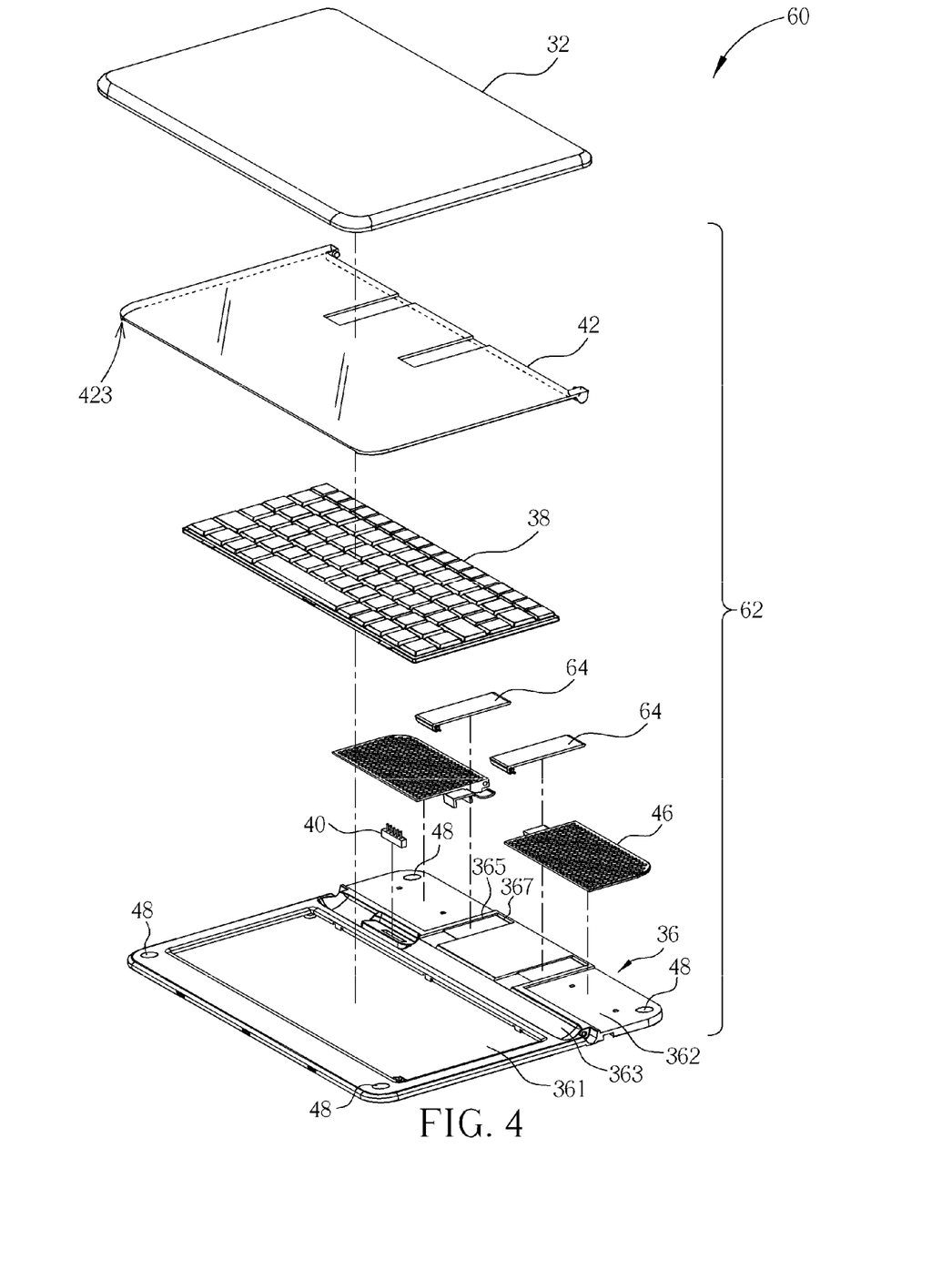
FIG. 4 is an exploded diagram of a computer system according to a second embodiment of the present invention.

Please refer to FIG. 4. FIG. 4 is an exploded diagram of a computer system 60 according to a second embodiment of the present invention. In the second embodiment, elements having the same numerals as ones of the first embodiment have the same structures and functions, and detailed description is omitted herein for simplicity. The computer system 60 includes the portable computer 32 and an external extension 62. In the second embodiment, the external extension 62 can further include at least one supporting component 64, which has functions similar to the holding component 44 of the external extension 34 in the first embodiment. At least one sliding slot 365 can be formed on the second area 362 of the base 36. The sliding slot 365 is disposed on a position corresponding to the supporting component 64, and at least one contacting portion 367 can be disposed inside the sliding slot 365. The contacting portion 367 can be a wall. An end of the supporting component 64 can be disposed on the protecting cover 42 in a pivotable manner, and the other end of the supporting component 64 can be disposed inside the sliding slot 365 on the second area 362 in a slidable manner. When the protecting cover 42 pivots relative to the base 36 at the second position, the side of the protecting cover 42 contacts against the lateral side of the second area 362, and the other end of the supporting component 64 can contact against the contacting portion 367 of the sliding slot 365 for constraining the rotational movement of the protecting cover 42 relative to the base 36. In the embodiment, the amount of the contacting portion 367 is not limited. For example, a plurality of contacting portions 367 can be disposed inside the sliding slot 365, and the visual angle between the portable computer 32 and the keyboard module 38 can be adjusted by contacting the other end of the supporting component 64 against different contacting portions 367.

Figure 5:
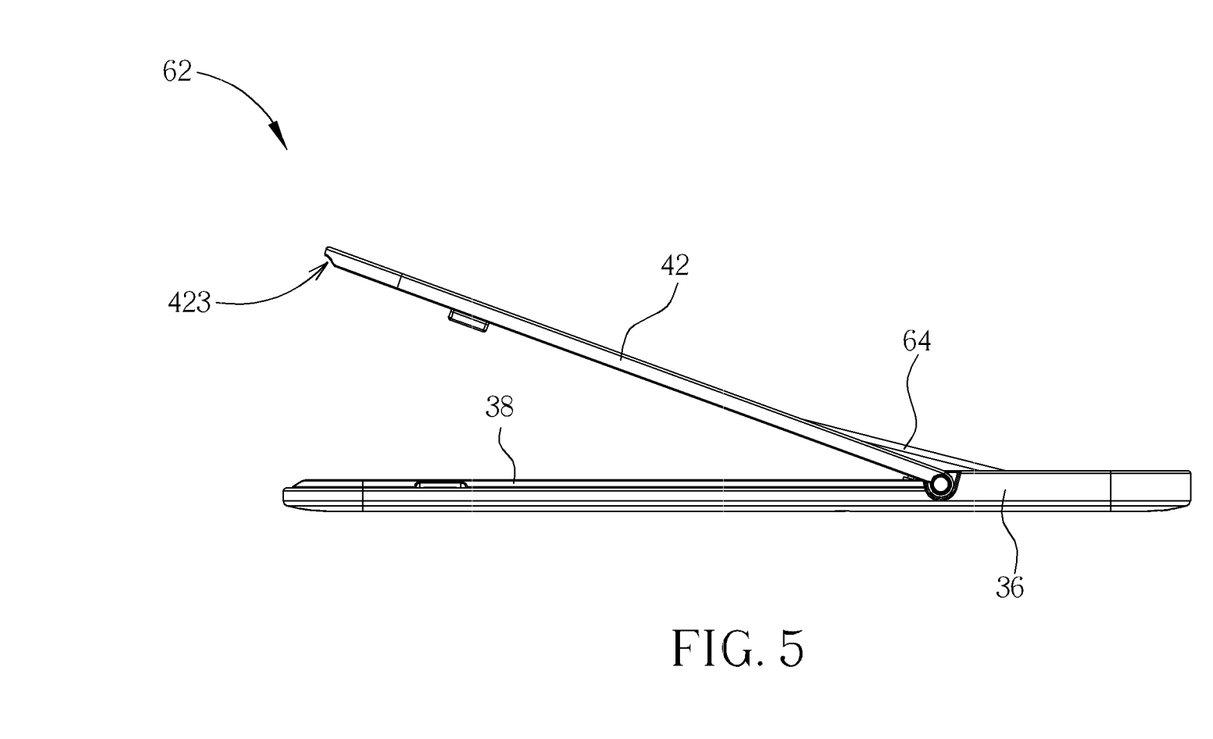
FIG. 5 to FIG. 7 are diagrams of the computer system in different operating modes according to the second embodiment of the present invention.
Figure 6:
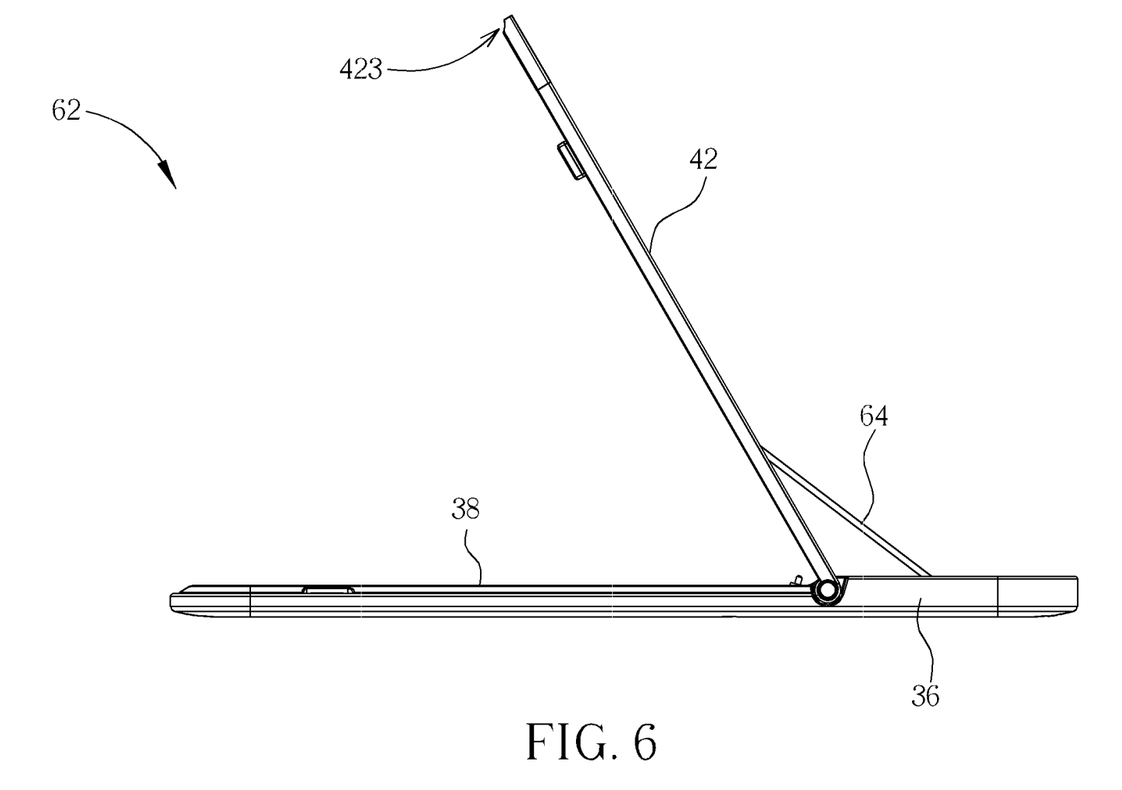
Figure 7:
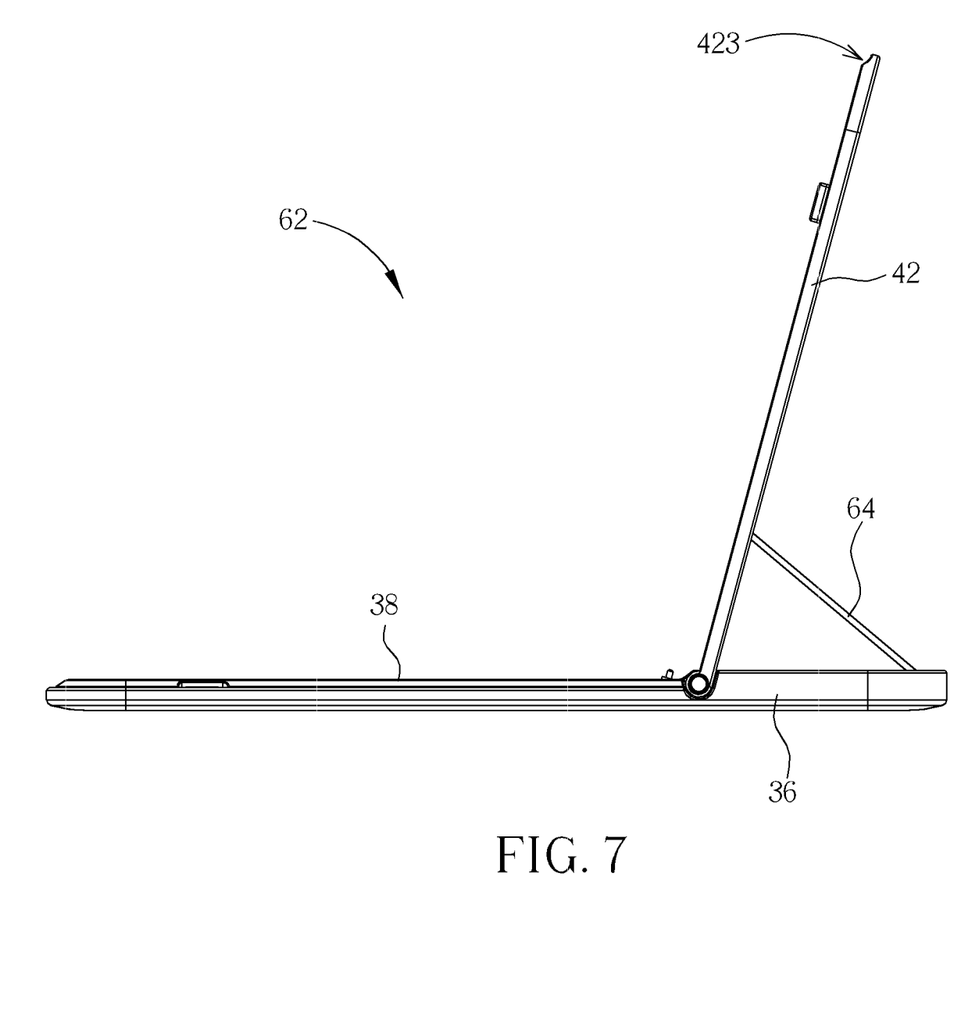

Please refer to FIG. 5 to FIG. 7. FIG. 5 to FIG. 7 are diagrams of the computer system 60 in different operating modes according to the second embodiment of the present invention. The user can pivots the protecting cover 42 relative to the base 36 for unfolding the external extension 62. As shown in FIG. 5 to FIG. 7, because two ends of the supporting component 64 are respectively disposed on the protecting cover 42 and the sliding slot 365, the protecting cover 42 can drive the other end of the supporting component 64 to slide along the sliding slot 365 with the rotational movement of the protecting cover 42 until the side of the protecting cover 42 contacts against the lateral side of the second area 362. When the protecting cover 42 pivots relative to the base 36 at the second position, the other end of the supporting component 64 stops by the contacting portion 367, so that the predetermined visual angle can be formed between the protecting cover 42 and the keyboard module 38. That is to say, mechanism of the protecting cover 42, the supporting component 64, and the sliding slot 365 performs a design with a combination of a linkage and a sliding track. Finally, the portable computer 32 is placed on the third area 363 and contacts against the protecting cover 42, so that the predetermined visual angle can be formed between the portable computer 32 and the keyboard module 38, and assembly of the external extension 62 and the portable computer 32 is finished. Disassembly method of the external extension 62 is reverse to the above-mentioned method, and detailed description is omitted herein for simplicity.

Comparing to the prior art, the external extension of the computer system of the present invention not only includes the protecting cover for preventing the keyboard module from being destroyed by the dust and the mist, but also can utilize the protecting cover to hold the portable computer, so as to form the predetermined visual angle between the portable computer and the keyboard module for comfortable operation. In addition, the protecting cover of the external extension can be utilized to hold the portable computer with the holding component or the supporting component for preferred stability.

Those skilled in the art will readily observe that numerous modifications and alterations of the device and method may be made while retaining the teachings of the invention.

What is claimed is:

1. An external extension for holding a portable computer, comprising:
   a base, the base comprising a first area, a second area, and a third area;
   a keyboard module disposed on the first area of the base;
   a pin set disposed on the third area of the base and electrically connected to the keyboard module for connecting to the portable computer so as to transmit a signal generated by the keyboard module to the portable computer; and
   a protecting cover disposed on the first area of the base in a pivotable manner and adjacent to the second area, the protecting cover covering the keyboard module when the protecting cover pivots relative to the base at a first position, and the protecting cover being for holding the portable computer when the protecting cover pivots relative to the base at a second position and a side of the protecting cover contacts against a lateral side of the second area so that a visual angle is formed between the portable computer and the keyboard module.

2. The external extension of claim 1, wherein the third area is disposed between the first are and the second area, and the third area is a sunken structure for placing the portable computer.

3. The external extension of claim 1, wherein an arc structure is formed on a lateral side of the protecting cover, and a curvature of the arc structure is substantially equal to a curvature of a casing of the portable computer.

4. The external extension of claim 1, wherein the visual angle is substantially 105 degrees.

5. The external extension of claim 1, further comprising:
   a speaker module disposed on the second area of the base and electrically connected to the pin set.

6. The external extension of claim 1, further comprising:
   a holding component, an end of the holding component being disposed on the second area of the base in a pivotable manner, at least one fixing portion being formed on the protecting cover for fixing the other end of the holding component so as to constrain rotational movement of the protecting cover relative to the base when the protecting cove pivots relative to the base to the visual angle.

7. The external extension of claim 6, wherein the fixing portion is a slot.

8. The external extension of claim 1, wherein the pin set is a pogo pin.

9. The external extension of claim 1, further comprising:
   a supporting component, an end of the supporting component being disposed on the protecting cover in a pivotable manner, a sliding slot being formed on the second area of the base, at least one contacting portion being disposed inside the sliding slot, and the other end of the supporting component being disposed inside the sliding slot of the second area in a slidable manner for contacting against the contacting portion of the sliding slot so as to constrain rotational movement of the protecting cover relative to the base when the protecting cover pivots relative to the base.

10. The external extension of claim 1 further comprising:
    a magnetic component disposed on the base for attracting the portable computer so as to combine the external extension with the portable computer.

11. A computer system comprising:
    a portable computer; and
    an external extension for holding the portable computer, the external extension comprising:
    a base, the base comprising a first area, a second area, and a third area;
    a keyboard module disposed on the first area of the base;
    a pin set disposed on the third area of the base and electrically connected to the keyboard module for connecting to the portable computer so as to transmit a signal generated by the keyboard module to the portable computer; and
    a protecting cover disposed on the first area of the base in a pivotable manner and adjacent to the second area, the protecting cover covering the keyboard module when the protecting cover pivots relative to the base at a first position, and the protecting cover being for holding the portable computer when the protecting cover pivots relative to the base at a second position and a side of the protecting cover contacts against a lateral side of the second area so that a visual angle is formed between the portable computer and the keyboard module.

12. The computer system of claim 11, wherein the third area is disposed between the first are and the second area, and the third area is a sunken structure for placing the portable computer.

13. The computer system of claim 11, wherein an arc structure is formed on a lateral side of the protecting cover, and a curvature of the arc structure is substantially equal to a curvature of a casing of the portable computer.

14. The computer system of claim 11, wherein the visual angle is substantially 105 degrees.

15. The computer system of claim 11, wherein the external extension further comprises:
a speaker module disposed on the second area of the base and electrically connected to the pin set.

16. The computer system of claim 11, wherein the external extension further comprises:
a holding component, an end of the holding component being disposed on the second area of the base in a pivotable manner, at least one fixing portion being formed on the protecting cover for fixing the other end of the holding component so as to constrain rotational movement of the protecting cover relative to the base when the protecting cover pivots relative to the base to the visual angle.

17. The computer system of claim 16, wherein the fixing portion is a slot.

18. The computer system of claim 11, wherein a sliding slot is formed on the second area of the base, at least one contacting portion is disposed inside the sliding slot, the external extension further comprises a supporting component, an end of the supporting component is disposed on the protecting cover in a pivotable manner, and the other end of the supporting component is disposed inside the sliding slot of the second area in a slidable manner for contacting against the contacting portion of the sliding slot so as to constrain rotational movement of the protecting cover relative to the base when the protecting cover pivots relative to the base.

19. The computer system of claim 11, wherein the external extension further comprises a magnetic component disposed on the base for attracting the portable computer so as to combine the external extension with the portable computer.

20. The computer system of claim 11, wherein the pin set is a pogo pin.

* * * * *